United States Patent [19]

Mosse

[11] 4,102,725

[45] Jul. 25, 1978

[54] METHOD OF MAKING A LAMINAR HOLLOW BODY OF ANGULAR CROSS-SECTION AND APPARATUS FOR PERFORMING THE METHOD

[75] Inventor: Richard Wolfgang Mosse, London, England

[73] Assignee: Corrugated Products GmbH, Frankfurt am Main, Germany

[21] Appl. No.: 791,014

[22] Filed: Apr. 26, 1977

[51] Int. Cl.[2] .......................... B31F 1/00; B29D 23/10

[52] U.S. Cl. .................................... 156/200; 156/222; 156/461; 156/471

[58] Field of Search ............... 156/201, 210, 200, 203, 156/217, 461, 462, 463, 470, 471, 469, 472, 473, 474; 93/58 ST, 58.1, 58.2 R, 1 G

[56] References Cited

U.S. PATENT DOCUMENTS

| | | | |
|---|---|---|---|
| 1,815,887 | 7/1931 | Agar | 156/201 |
| 2,206,962 | 7/1940 | Karcher | 156/183 |
| 3,386,323 | 6/1968 | Dovey | 93/58.2 R |

*Primary Examiner*—Douglas J. Drummond
*Assistant Examiner*—William H. Thrower
*Attorney, Agent, or Firm*—Hans Berman

[57] ABSTRACT

A laminar body is prepared from sheets of cardboard and the like by forming an elongated intergral rib in one major face of a first sheet and a corresponding groove in the second major face. A second sheet is fastened adhesively in area contact to the second major face of the first sheet in a position in which the second sheet bounds an elongated duct in the groove. The two sheets, thereby secured to each other, are bent angularly about a line parallel to and adjacent the groove so that the second sheet is on the inside of the resulting bend.

12 Claims, 4 Drawing Figures

METHOD OF MAKING A LAMINAR HOLLOW BODY OF ANGULAR CROSS-SECTION AND APPARATUS FOR PERFORMING THE METHOD

This invention relates to a method of making a laminar body of angular cross section and to apparatus for making the body.

The invention will be described with reference to the making of cardboard boxes of rectangular prismatic shape, but it is not limited to the specific material referred to nor to the specific shape of the product.

Many types of equipment are available for making hollow, cylindrical, laminar bodies of cardboard by continuously winding a web of cardboard on a rotating mandrel in a helical pattern. Other available equipment winds a sheet of cardboard on a rotating mandrel in several, axially coextensive layers. If boxes of angular cross section are desired, the initially cylindrical, tubular bodies are subjected to a secondary shaping operation which causes a major portion of the ultimate cost of the product because the secondary operation cannot be performed continuously. It also is limited to materials that can withstand the stresses applied during the secondary shaping and containers of a size that can be made in this manner at acceptable cost.

A primary object of this invention is the provision of a method which permits laminar, hollow bodies of sheet material having an angular cross section to be made continuously in a single operation.

Another important object is the provision of apparatus for performing the method of this invention.

The method, in one of its more specific aspects, produces a laminar body from a plurality of sheet members having each first and second major faces separated by the thickness of the sheet member. An elongated, integral rib is formed in the first major face of a first sheet member and a corresponding, elongated groove in its second major face. The first face of a second sheet member is secured to the second face of the first sheet member in area contact in a position in which the second sheet member bounds an elongated duct in the groove. The first and second sheet members, being secured thereby to each other, are bent angularly about a line parallel to and adjacent the groove.

The apparatus employed for performing this method includes feeding means for feeding the first sheet member to a forming station at which forming tools form the rib and groove in the first sheet member. Securing means are provided for securing the first and second sheet members to each other in the manner indicated above, and bending means thereafter bend the secured first and second sheet members about the line parallel to the groove.

Other features, additional objects, and many of the attendant advantages of this invention will readily become apparent from the following detailed description of apparatus of the invention and of its mode of operation when considered in connection with the appended drawing in which.

Figure 1:
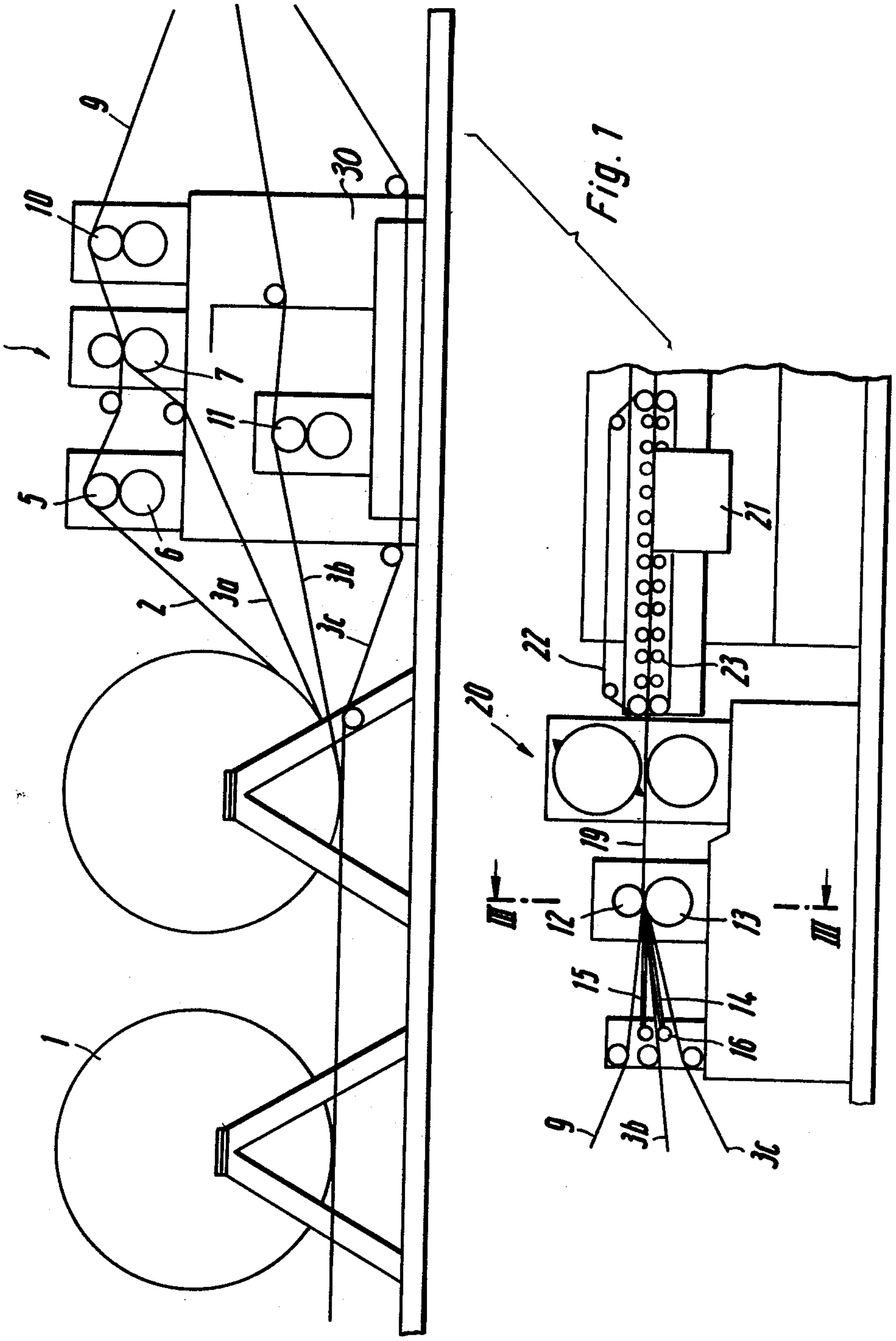
FIG. 1 illustrates a portion of a continuous production line for making tubular, laminar cardboard shells in simplified, partly sectional side elevation.

Referring now to the drawing in detail, and initially to FIG. 1, there are shown two of the four reels 1 from which a continuous web 2 of thin, decorative paper and three continuous webs **3*a*, 3*b*, 3*c* of cardboard are being unwound, the several webs being held taut by non-illustrated brakes on the reels 1. The webs are fed in a common direction through a coating station 4 at which the paper web 2 passes over a coating roller 5 to which a liquid adhesive is transferred from a nonillustrated trough by a transfer roller 6. The coated paper web 2 and the cardboard web 3*a* jointly pass between two pressure rollers 7 which secure the coated face of the paper web 2 to the cardboard web 3*a*, whereby a laminar web 9 is discharged from the pressure rollers 7 and led over another coating roller 10 which deposits adhesive on the entire, exposed major face of the cardboard in the laminar web 9. The entire face of the cardboard web 3*b* directed away from the laminar web 9 and toward the cardboard web 3*c* is coated with adhesive by yet another coating roller 11**.

The adhesive-coated laminar, first web 9, the coated, second, cardboard web **3*b*, and the third cardboard web 3*c* are guided through a forming zone to the nip or gap between a circumferentially grooved, cylindrical roller 12 and a smoothly cylindrical pressure roller 13 mounted on a common support 30 over four spacedly juxtaposed pairs of guide rails 14, 15. The rails are elongated in the direction of web travel, the four rails 14 being mounted between the webs 3*b*, 3*c* and the rails 15 between the webs 9, 3*b***.

Figure 3:
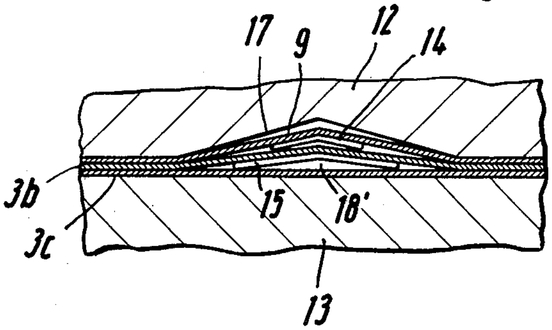
FIG. 3 illustrates elements of the production line in enlarged, front elevational section on the line III — III in FIG. 1.
Figure 4:
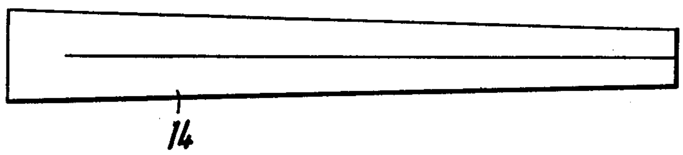
FIG. 4 shows one of the elements of the device of FIG. 3 in top plan view on a larger scale.

As is better seen in FIGS. 3 and 4, each rail 14, 15 is made of an originally rectangular piece of sheet metal partly creased so that the cross section of the rail is V-shaped at one end while the rail is flat at the other end. The flat ends of the rails 14 are mounted on a horizontal shaft 16 journaled in the support 30 for free, angular movement about an axis transverse to the direction of web movement, and the rails 15 are similarly mounted.

Figure 2:
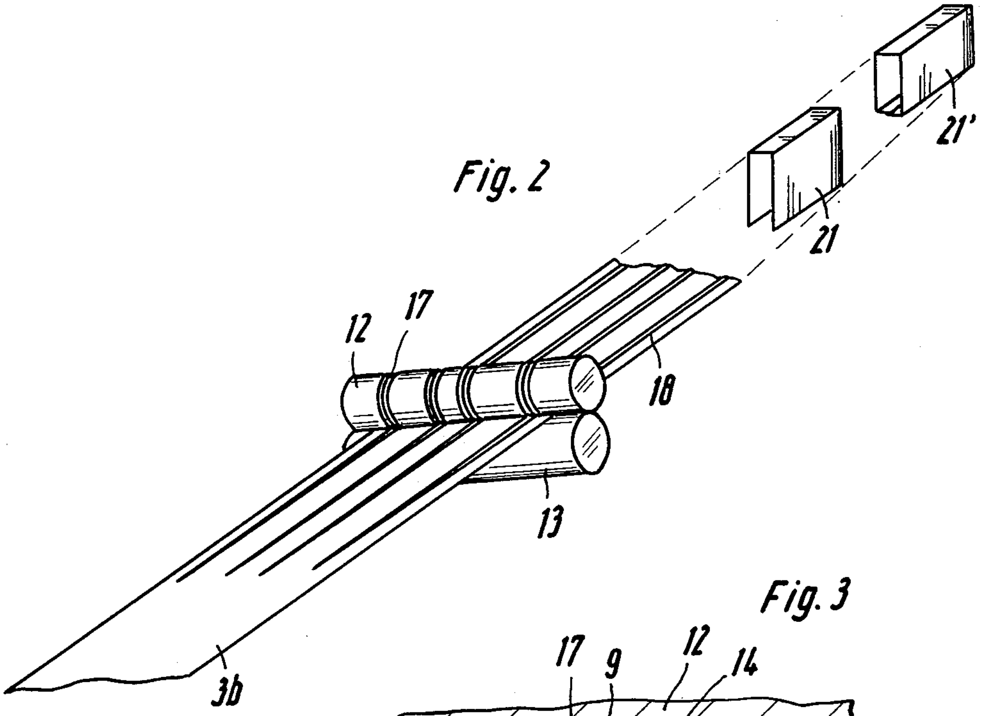
FIG. 2 shows elements of the apparatus of FIG. 1 and portions of a cardboard web passing through the apparatus in a fragmentary, perspective view.

FIG. 2 shows the roller 12 to be provided with four, axially spaced, annular, circumferential grooves 17 which define enlarged portions of the nip. One pair of rails 14, 15 is approximately tangentially aligned with each groove 17, and the V-shaped ends of the rails are received in the associated grooves as is evident from FIG. 3, so that three gaps are radially defined by the rollers and rails. Traction is exerted on the webs **9, 3*b*, and 3*c* by the pressure roller 13 and the smoothly cylindrical sections of the roller 12. The resulting tension in the webs 9, 3*b*, 3*c* causes the webs 9, 3*b* to conform to the rails 15, 14 respectively, whereby material of each web is gathered laterally on the underlying rail in the forming zone, while the cross section of the third web 3*c* remains practically rectilinear as is shown in FIG. 3**.

As the webs are released from the rails 14, 15 in the nip of the rollers 12, 13, the excess material of the web **3*b* forms a rib 18 and a coextensive groove in the bottom face of web 3*b*. In the laminar material leaving the rollers 12, 13, the top face of the web 3*c* is adhesively fastened to the undeformed portions of the web 3*b* between the ribs and grooves and downwardly seals a duct 18' in the rib 18**.

Only the web 3*b* is shown in FIG. 2 for the sake of clarity. As it leaves the rollers 12, 13, it carries four continuous ribs 18 elongated in the direction of web travel and held in the desired shape by the non-illustrated web 3*c*. Somewhat larger ribs and grooves are formed in the web 9 by the rails 15 as is evident from FIG. 3, but not explicitly shown in FIG. 2. The ribs 18 of the web 3*b* are received in corresponding grooves of the web 9, and the portions of the top face of the web 3*b* between the ribs are adhesively secured to the corresponding bottom face portions of the web 9. A single, continuous, laminar web 19 is discharged from the rollers 12, 13.

The web 19 is cut transversely by a conventional rotary cutter 20 into rectangular blanks which are gripped between three pairs of steel belts 22 trained over respective arrays of backing pulleys 23, only one array of pulleys and the associated belts being shown in FIG. 1. The belts bend the substantially planar blank discharged from the cutter 20 along two lines parallel to and contiguously adjacent the groove 18' in the web 3*b* formed by the two axially central grooves 17 of the roller 12. The resulting approximate U-shape of the blank 21 is shown in FIG. 2. Another, non-illustrated set of belts and pulleys bends the two flat edge portions of the blank 21 toward each other over a mandrel, not shown, to produce the prismatic tubular body 21' (FIG. 2) whose closely juxtaposed edges ultimately are fastened to each other in a conventional manner not shown. The bending steps and subsequent operations which finish the prismatic tube and provide it with a bottom and top are too well known to require detailed description.

The pressure rollers 7, the rollers 12, 13, and the cutter 20 are driven at speeds precisely correlated to maintain the necessary tension in the traveling webs. A common drive motor and variable-speed transmissions suitable for the intended purpose will readily be chosen for this purpose.

During the bending of the blank 21, the grooves 18' in the web 3*b* and the corresponding grooves in the web 9 disappear completely if the rails 14, 15 are properly dimensioned. The inner surface of the prismatic body ultimately produced is provided by one of the major faces of the web 3*c*. The web 3*b* is bent over the other major face of the web 3*b* and absorbs an additional amount of sheet material according to the thickness of the web 3*c*. Similarly, a greater amount of material is required for bending the web 9 over the outer face of the web 3*b* and is provided by the ribs formed in the web 9 by the guide rails 15. The stress unavoidable in converting an initially cylindrical, laminar tube into a prismatic tube is avoided largely or completely in the prismatic bodies made in continuous operation according to the method outlined above.

The making of a rectangularly prismatic, laminar cardboard body was described, but the method and apparatus of the invention are not limited to specific materials, nor to specific shapes. Prismatic bodies having fewer or more than four edges may be made according to this invention not only from cardboard, but also from other sheet materials, and the methods and materials employed for securing the several layers to each other between the ribs will be chosen accordingly. Heat sealing of thermoplastic materials is specifically contemplated. If a sufficient number of guide rails and corresponding annular grooves 17 in the roller 12 is provided, the laminar product may assume a cross-section closely approximating a circle or an ellipse.

It should be understood, therefore, that the foregoing disclosure relates only to a preferred embodiment, and that it is intended to cover all changes and modifications of the example of the invention herein chosen for the purpose of the disclosure which do not constitute departures from the spirit and scope of the invention set forth in the appended claims.

What is claimed is:

1. A method of making a laminar body from a plurality of elongated sheet members, each sheet member having first and second, opposite major faces separated by the thickness of the sheet member, which method comprises:

(a) moving a first, a second, and a third sheet member continuously and longitudinally, said sheet members being moved sequentially through a coating zone, a forming zone, a securing zone, and a bending zone, said zones being offset from each other in the direction of sheet movement;

(b) coating two of said major faces of said first, second, and third sheet members in said coating zone with an adhesive composition over the respective full widths thereof;

(c) forming a plurality of transversely spaced, longitudinal, integral ribs in the first faces of said first and second sheet members and respective, coextensive, longitudinal grooves in the second faces of said first and second sheet members in said forming zone;

(d) adhesively securing the first face of said third sheet member to the second face of said second sheet member in said securing zone in fixed area contact in a position in which respective portions of the secured faces bound an elongated duct in each groove of the second sheet member, said two major faces including one of said secured faces;

(e) adhesively securing in said securing zone the first face of said second sheet member to the second face of said first sheet member in area contact in a position in which said ribs of said second sheet member are received in respective grooves of said first sheet member, and said ribs of the second sheet member and respective portions of said first sheet member bound an elongated duct in each receiving groove, said two major faces including one of the faces of said first and second sheet members secured to each other; and (f) angularly bending said first, second, and third sheet members while secured to each other in said area contact about a plurality of lines parallel to and adjacent respective grooves of said second sheet member, through respective angles smaller than 180°, said second face of the third sheet member bounding a corner of the angular laminar body resulting from said bending, and said first and second sheet members being offset outward of said corner from said third sheet member.

2. A method as set forth in claim 1, wherein the adhesively secured sheet members are cut transversely to the direction of elongation thereof into sections prior to said bending.

3. A method as set forth in claim 2, wherein said first and second members are reduced in width during said forming by an amount sufficient to provide the material of the ribs being formed therein.

4. A method as set forth in claim 3, wherein the cross section of said third sheet member remains substantially rectilinear during said moving until entering said bending zone.

5. Apparatus for making a laminar body from a plurality of sheet members comprising:

(a) a support;

(b) two rollers mounted on said support for rotation about respective axes extending in a common direction and having respective, radially juxtaposed, axial faces of circular cross section.

(1) said faces bounding a nip therebetween, (2) one of said faces being formed with a plurality of axially spaced, annular grooves, (3) each groove defining a radially enlarged portion of said nip;

(c) two guide members associated with each of said enlarged portions, (1) said guide members being mounted on said support and radially spaced from said rollers and from each other in the associated enlarged nip portion, (2) whereby said rollers and the associated guide members define three gaps therebetween in each of said enlarged portions;

(d) feeding means for continuously feeding three elongated sheet members longitudinally through said nip in superposed relationship, (1) respective portions of said sheet members extending along longitudinal lines being fed through said gaps; and (e) bending means for continuously and jointly bending said sheet members along said lines.

6. Apparatus as set forth in claim 5, wherein said guide members are elongated in the direction of said feeding, respective longitudinally terminal portions of said guide members being mounted on said support and received in said enlarged portions.

7. Apparatus as set forth in claim 6, wherein the terminal portions of said guide members received in said enlarged portions are V-shaped in cross section.

8. Apparatus as set forth in claim 7, wherein the portions of said guide members mounted on said support are substantially flat.

9. Apparatus as set forth in claim 7, further comprising supply means for supplying said sheet members to said nip in superposed relationship, one of said sheet members being interposed between the other two sheet members, whereby each major face of said one sheet member constitutes a pair of opposite faces with a corresponding face of one of the two other sheet members, and coating means for coating one face of each pair of opposite faces with an adhesive composition prior to said feeding.

10. Apparatus as set forth in claim 9, wherein said coating means include means for coating the full width of said one face of each pair of opposite faces.

11. Apparatus as set forth in claim 7, wherein the other one of said axial faces and the portions of said one axial face intermediate said grooves are smoothly cylindrical.

12. Apparatus as set forth in claim 7, wherein said guide members are elongated substantially tangentially relative to the associated grooves.

* * * * *